United States Patent [19]

Bazlen et al.

[11] 4,398,247

[45] Aug. 9, 1983

[54] CONTROL DEVICE FOR DIRECTING EXECUTION OF FORCED OPERATIONS IN A DATA PROCESSING SYSTEM

[75] Inventors: Dieter Bazlen, Stuttgart; Dietrich W. Bock, Schoenaich; Klaus J. Getzlaff, Boeblingen; Johann Hajdu, Boeblingen; Helmut Painke, Boeblingen, all of Fed. Rep. of Germany

[73] Assignee: International Business Machines Corporation, Armonk, N.Y.

[21] Appl. No.: 186,876

[22] Filed: Sep. 12, 1980

[30] Foreign Application Priority Data

Sep. 19, 1979 [DE] Fed. Rep. of Germany ....... 2937777

[51] Int. Cl.³ .............................................. G06F 9/18
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,422,404 | 1/1969 | Ferguson | 364/200 |
| 3,718,912 | 2/1973 | Hasbrouck et al. | 364/200 |
| 3,889,242 | 6/1975 | Malmer, Jr. | 364/200 |
| 3,924,242 | 12/1975 | Naud | 364/200 |
| 4,040,030 | 8/1977 | Cassonnet | 364/200 |
| 4,063,081 | 12/1977 | Handly et al. | 364/200 |
| 4,064,554 | 12/1977 | Tubbs | 364/200 |
| 4,095,278 | 6/1978 | Kihara | 364/900 |
| 4,142,246 | 2/1979 | Fumihiko et al. | 364/900 |
| 4,291,371 | 9/1981 | Holtey | 364/200 |
| 4,306,289 | 12/1981 | Lumley | 364/200 |

Primary Examiner—Mark E. Nusbaum
Assistant Examiner—William G. Niessen
Attorney, Agent, or Firm—Saul A. Seinberg

[57] ABSTRACT

In executing and controlling internal data flow for a particular program, it is often necessary to delay execution of an instruction by the insertion of an appropriate number of wait cycles. Thus, it may be necessary to interrupt instruction execution, for example, to insert a given number of wait cycles for channel access to common storage of the data processing system, for reloading a data or instruction buffer, or for a like situation. In such cases, the control unit has to ignore the particular instruction awaiting execution and execute another forced operation instead.

An appropriate code is provided for a NO OPERATION instruction, say all bits zero. When a forced operation is to be executed, this code can be generated with fewer logic means at the output of the instruction register. As a result, there are no control signals active at the output of the decoder. The signals indicating forced operations have to be considered by the decoder only if a control signal is to be generated.

If the control signals need be grouped for physical reasons, it is possible to determine which of these signals are a function of forced operations. This will negate the need to otherwise distribute these control signals throughout the decoder, thereby reducing and simplifying the wiring required.

6 Claims, 4 Drawing Figures

4,398,247

CONTROL DEVICE FOR DIRECTING EXECUTION OF FORCED OPERATIONS IN A DATA PROCESSING SYSTEM

BACKGROUND OF THE INVENTION

1. Field of the Invention

This invention concerns an arrangement for controlling certain internal operations in a data processing system. It pertains, more particularly, to apparatus for controlling operations forced by specific conditions in the control unit of a data processing system.

2. Description of the Prior Art

It is often necessary with particular states during the internal program flow of an electronic data processing system to delay the execution of a current instruction to permit the insertion of wait cycles. It may also be necessary to interrupt instruction execution to insert a particular number of wait cycles, for example, for channel access to common storage of the data processing system, for reloading a data or an instruction buffer, or for like control situations. In all these cases, it is necessary for the control unit to ignore the instruction awaiting execution and to execute another forced operation instead.

Prior art control units found in known data processing systems, such as the IBM System 370, Model 115, for example, contain such essential elements as control storage and data flow control gates. In addition, they include an instruction register, a clock pulse generator, an operation decoder and a priority logic circuit. The priority logic circuit arranges, in accordance with a predetermined weighting, the waiting internal or external machine conditions which would dictate an interrupt and in response thereto generates the bits necessary for an operation forced by said conditions.

The priority circuit is understandably complex. It includes many logic gates that perform combinational tasks, circuits for inhibiting and enabling control signal flow and circuits for generating certain of the control signals themselves. Unfortunately, such an overall circuit structure is disadvantageous with regard to its manufacturing costs, the number of components required and its error rate.

OBJECTS AND SUMMARY OF THE INVENTION

Accordingly, it is a principal object of the present invention to provide in the control unit of a data processing system, an arrangement for controlling forced operations, which arrangement requires fewer system components and less elaborate wiring. Such an arrangement would also have a lower error rate.

It is also an object of the present invention to provide a control unit for a data processing system which is faster in operation while still being itself simpler in structure and operation than prior art devices.

The foregoing and other objects of the present invention are accomplished by providing a control device which, if a particular condition requiring the execution of forced instructions is present, sets the operation code bits of the current instruction to a predetermined and particular code combination. This code combination triggers a NO OPERATION (NOP) instruction in an operation decoder when received and, in whose presence, the decoder will generate only control signals dependent upon predetermined bits of a forced operation. In addition, inhibit circuitry is provided to insure that the decoder will not need to deal with control signals which are dependent upon the current instruction, which is being forced to wait execution.

DESCRIPTION OF THE PREFERRED EMBODIMENT

Figure 1:
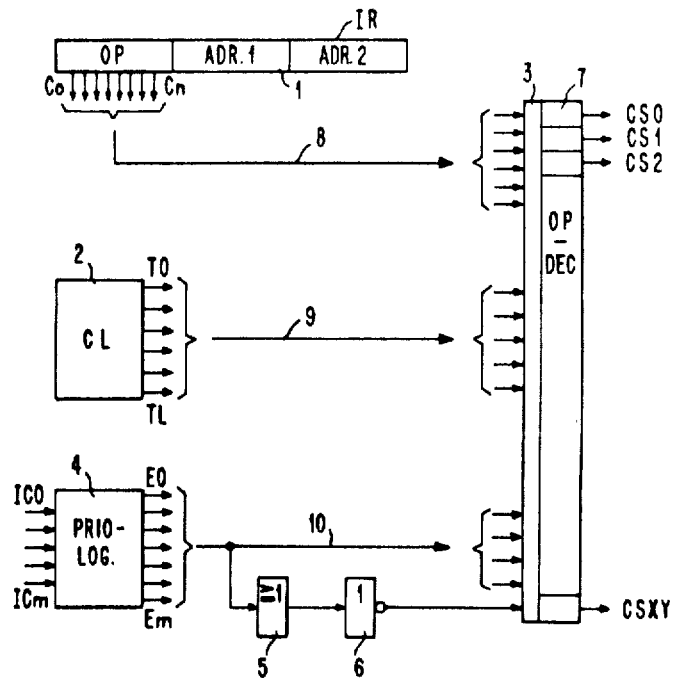
FIGS. 1 and 2 schematically illustrate a prior art control unit for executing forced operations in a data processing system.
Figure 2:
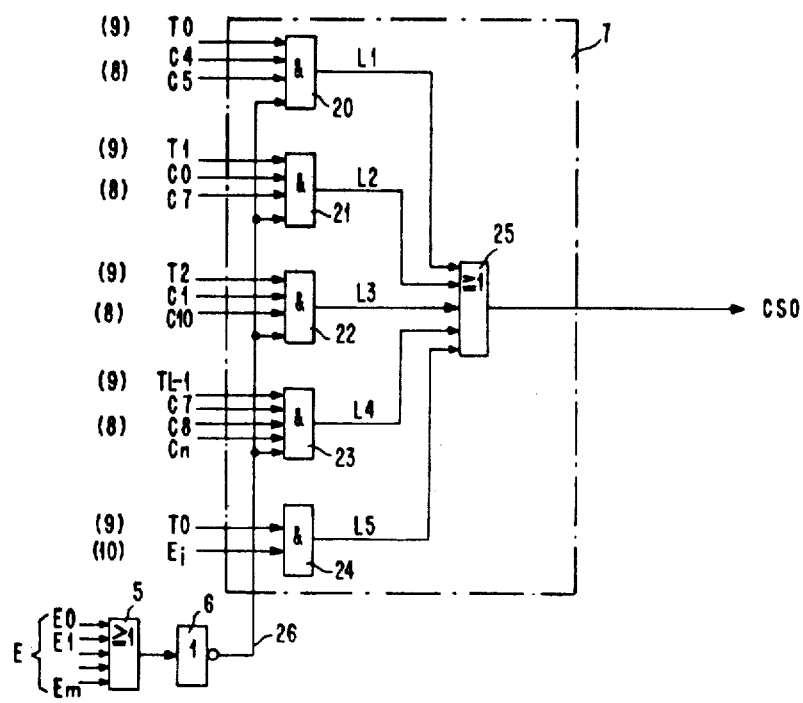

Referring now to the drawings wherein like reference numerals have been used in the several views to identify like elements, FIGS. 1 and 2 schematically illustrate a known type of control unit for executing forced operations in an International Business Machines Corporation's System/370, Model 115 data processing system. In addition to certain essential elements such as control storage and data flow gates, not shown, this device includes an instruction register 1 (IR), a clock pulse generator 2 (CL), an operation decoder 3 (OP-DEC), as well as a priority logic circuit 4 (PRIO-LOG). The logic circuit 4 arranges, in accordance with predetermined priority, the waiting internal or external machine conditions IC0 to ICm necessitating an interrupt and generates in response thereto the bits E0 to Em of an operation forced by said conditions.

In the operation decoder 3, the bits C0 to Cn of the operation code (OP), the clock signals representing the cycle times T0 to TL of a variable length instruction, as well as the bits E0 to Em of forced operations are combined and decoded and then output in the form of control signals CS0 to CSXY, which signals are utilized to control the data flow. The partial element 7 of the operation decoder 3, namely the element generating the control signal CS0 for particular parts of the data flow, is shown in greater detail in FIG. 2. The remaining control signals CS1 to CSXY are generated by partial elements, not shown, similar to partial element 7 which are provided for that purpose.

As shown in FIG. 2, the control signal CS0 is emitted as the output signal of OR gate 25. The OR gate 25 is tied, via its input lines L1 to L5, to receive the output signals respectively of AND gates 20 to 24. Particular clock signals or, more accurately, the time control signals corresponding to the instruction cycle times T0 to TL and which are transferred via cable 9 (shown as the bracketed numeral 9 in FIG. 2), are applied to the inputs of the AND gates 20 to 24. In addition, particular bits Ci of the operation code are applied, as indicated by the bracketed reference numeral 8, to the inputs of the AND gates 20 to 23. In place of the bits Ci, one or several bits Ei of the forced operation to be executed are applied to AND gate 24. During execution of a forced operation, all of the AND gates 20 to 23 to which bits Ci of the operation code are applied, must be inhibited. This is necessary so that the control signal CSi is generated only by the AND gates, in this instance AND gate 24, to which the bits Ei of the forced operation are applied.

For this purpose, AND gates 20 to 23 are provided with a further input which is connected to the output of an inhibit circuit consisting of OR gate 5 and inverter 6. The bits E0 to Em of the forced operations are applied to the inputs of the OR gate 5. If none of these bits Ei are present, an inhibit signal on output line 26 is set to a logical high and the output of inverter 6 supplies an enable signal to AND gates 20 to 23. Only after one or more of the several bits E0 to Em of the forced operation are available at the input of OR gate 5 will an inhibit signal for said AND gates be generated and made available at the output of the inverter 6.

As may be seen in FIGS. 1 and 2, of the various xy+1 partial elements 7 of the operation decoder 3, all those AND gates combining the instruction cycle times Ti with the bits Ci of the operation code OP must have additional inhibit inputs. This requires additional wiring to the inhibit circuit formed by OR gate 5 and inverter 6. Furthermore, the output load on the inverter 6 as a consequence of this requirement becomes extremely high due to the great number of AND gates needed to generate the control signals CSXY. This, in turn, leads to the addition of several such inhibit circuits thereby increasing the manufacturing costs, the number of components that are required and the error rate.

The instruction sets of almost all electronic data processing systems include a NO OPERATION (NOP) instruction having a particular operation code (OP code) which in its simplest form consists only of zeros; i.e., the state of whose bits C0 to Cn corresponds to a binary zero. The NOP instruction is decoded in the operation decoder 3a and circuit of FIG. 3 and causes either no control signals to be generated or only the generation of control signals CS0 to CSXY corresponding to the generation of a binary zero.

If, upon the occurrence of a condition necessitating a forced operation, the bits of the operation code can be switched to correspond to the operation code of a NO OPERATION instruction, then control bits appropriate thereto can be generated by decoding the bits E0 to Em of a forced operation. The operation decoder 3a, in such a case, is exclusively responsible for decoding the bits Ei of a forced operation since the bits Ci (all zero) of the operation code of a NOP instruction do not contribute to the generation of the control signals CS0 to CSXY.

Figure 3:
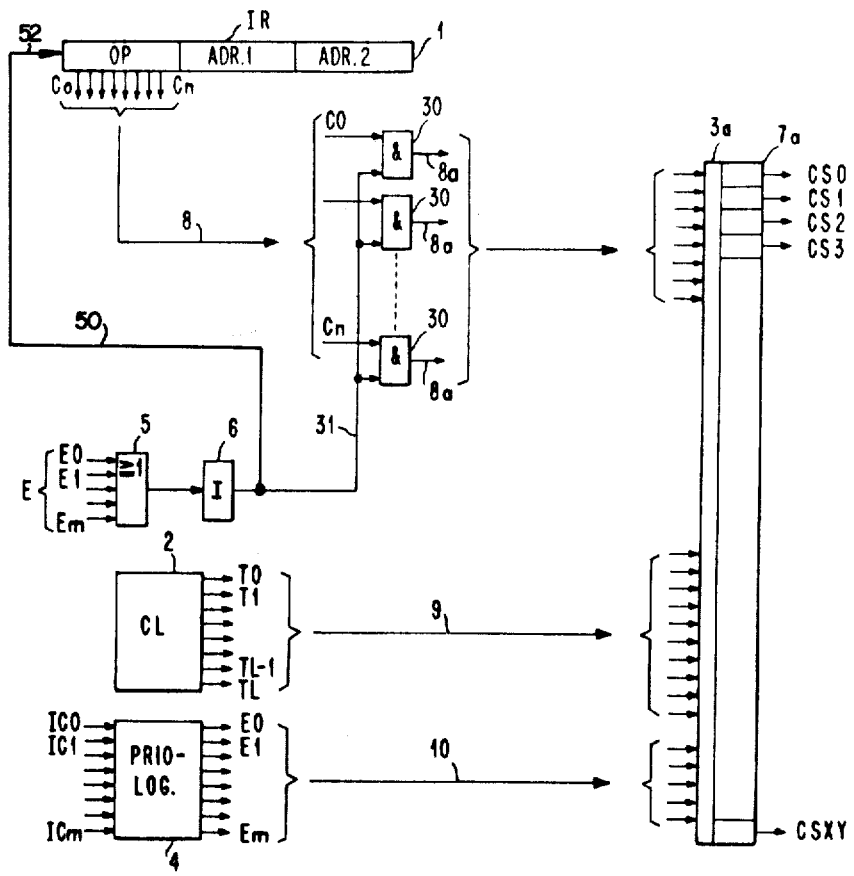
FIG. 3 functionally depicts a simplified control device in accordance with the present invention for executing forced operations in a data processing system.

A circuit arrangement which causes the operation decoder 3a to respond as though a NOP instruction was received from the instruction register whenever a forced operation is desired, so that the operation decoder will essentially function solely in response to inputs E0 to Em, is shown in FIG. 3. This circuit arrangement includes an instruction register 1, a clock pulse generator 2 and an operation decoder 3a. Also included is a code conversion initiate circuit similar in structure to the previously mentioned inhibit circuit combination of OR gate 5 and inverter 6 with which is associated a set of AND gates 30 each having two inputs, one of which is connected to the output of inverter 6. The other input to each of the AND gates 30 is connected respectively to a particular bit position of the operation code field in instruction register 1. By means of output signals from the inverter 6, AND gates 30 may be inhibited if individual bits E0 to Em of forced operations are present. When this situation occurs, the AND gates 30 will emit an output signal corresponding to a binary zero. The control signals CSi which are subsequently and responsively supplied by the operation decoder 3a are exclusively a function of a combination of particular signals representing instruction cycle times with particular bits Ei of the forced operations.

Figure 4:
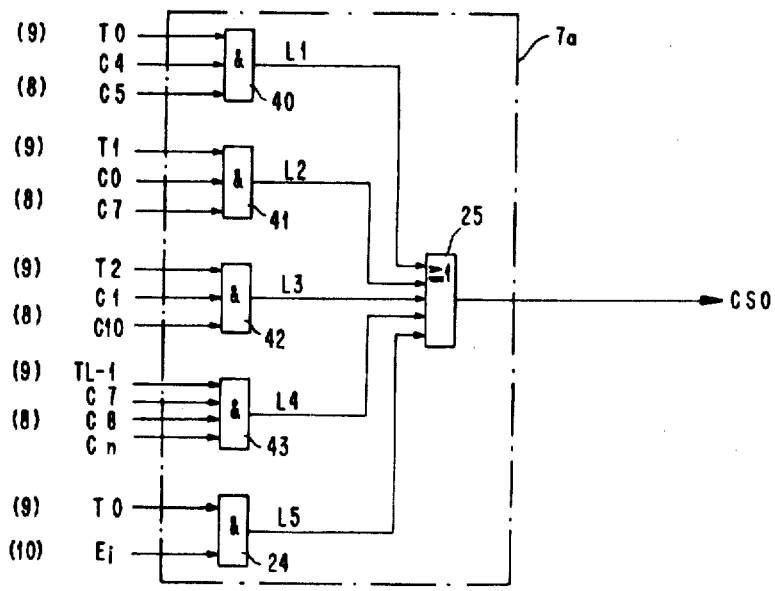
FIG. 4 schematically shows a portion of the decoder utilized in the FIG. 3 device.

The circuit arrangement shown in FIG. 3 may be modified to form another circuit which, also under the control of a code conversion initiate circuit formed by OR gate 5 and inverter 6, sets the field of the operation code in instruction register 1 proper to only zeros when execution of a forced operation is triggered by a particular condition. For example, the OP Code field of instruction register 1 can be set to all zeros by using signal line 50 which is connected between the output of inverter 6 and an active low reset input 52 of register 1. Thus, when the output of inverter 6 is set to a binary zero in response to the need for a forced operation, the OP Code field of register 1 would thereby be reset to all zeros. If a separate operation register is provided for the operation code of an instruction, then it will be set to only zeros to obtain the same result in response to execution of a forced operation by connecting signal line 50 between its reset input and the output of inverter 6. In either case, the operation decoder 3a will be forced to recognize the presence of a NOP instruction and generate control signals therefore in response to the bits Ei resulting from a forced operation. The modification to the FIG. 3 arrangement mainly involves a simplification of the operation decoder 3a. This circuit showing the modified partial element 7a thereof is depicted in FIG. 4.

A comparison of the element 7a with its counterpart 7 of the prior art device illustrated in FIGS. 1 and 2 shows that the AND gates 40 to 43 are incorporated in a simpler design as their number of inputs is reduced by one over that required by the corresponding AND gates 20 to 23 of the FIG. 2 arrangement. Only the structure associated with and involving AND gate 24 is identical for both of the partial elements 7 and 7a.

The savings afforded by the simpler configuration of AND gates 40 to 43 as opposed to that of AND gates 20 to 23 are attributable to the simpler total wiring and structure of decoder 3a. Thus, unlike decoder 3, decoder 3a need no longer be connected to several inhibit inputs to avoid the high output loads to which the inhibit circuitry was previously subjected nor will it be necessary to provide connections to a plurality of AND gates.

While the present invention has been described in the context of a preferred embodiment thereof, it will be readily apparent to those skilled in this art that modifications and variations can be made therein without departing from the spirit or scope of the present invention. Accordingly, it is not intended that the present invention be limited to the specifics of the foregoing description of the preferred embodiment. Instead, the present invention should be considered as being limited solely by the appended claims which define its scope.

Having thus described our invention, what we claim as new, and desire to secure by Letters Patent is:

1. In a data processing system having system control means for executing forced instructions in response to the presence of a particular condition requiring such execution, said system control means including means for generating inhibit signals indicative of the need to execute a forced instruction, apparatus for optimizing execution of forced conditions, said apparatus comprising:

(a) an instruction register for holding the bits, including the operation code, of the current instruction;

(b) an operation decoder for generating control signals in response to the receipt of signals defining a desired control action;

(c) first circuit means, operatively coupled between the operation code portion of said instruction register and said operation decoder, for converting the operation code bits of the current instruction to a predetermined code combination, in response to receipt of a code conversion initiating signal, which code combination triggers a NOP control signal reaction by said operation decoder; and (d) second circuit means, operatively coupled to receive said inhibit signals from said system control means and to an input of said first circuit means, for generating a code conversion initiating signal to apply to said first circuit means in response to said receipt of inhibit signals.

2. The apparatus according to claim 1 wherein said first and second circuit means respectively include:

(a) logic circuit means, coupled to receive and responsive to any of said inhibit signals generated by said system control means in response to a need to execute a forced operation, for generating a code conversion initiating signal whenever a forced operation is required; and (b) a plurality of AND gates, each one of which is connected between said instruction register and said operation decoder to receive respectively at an input thereof the output bits defining the operation code of the current instruction from said instruction register, the other input of each of said AND gates being coupled to receive said code conversion initiating signal from said logic circuit means.

3. The apparatus according to claim 2 wherein said logic circuit means includes:

(a) an OR gate, the inputs of which are coupled to receive said inhibit signals indicating the need for a forced operation from said system control means; and (b) an inverter, coupled between the output of said OR gate and an input of each of said plurality of AND gates.

4. The apparatus according to claim 1 wherein said instruction register includes a reset input which, when toggled by an appropriate signal, will set the operation code portion thereof to the code combination of only zeros of the NOP instruction and which further includes a signal line connected between the output of said second circuit means and said reset input of said instruction register to thereby implement a reset of the operation code portion of said instruction register in response to a requirement for executing forced operations.

,14

5. The apparatus according to claim 4 wherein said first and second circuit means respectively includes:

(a) logic circuit means, coupled to receive and responsive to any of said inhibit signals generated by said system control means in response to a need to execute a forced operation, for generating a code conversion initiating signal whenever a forced operation is required; and (b) a plurality of AND gates, each one of which is connected between said instruction register and said operation decoder to receive respectively at an input thereof the output bits defining the operation code of the current instruction from said instruction register, the other input of each of said AND gates being coupled to receive said code conversion initiating signal from said logic circuit means.

6. The apparatus according to claim 4 wherein said logic circuit means includes:

(a) an OR gate, the inputs of which are coupled to receive said inhibit signals indicating the need for a forced operation from said system control means; and (b) an inverter, coupled between the output of said OR gate and an input of each of said plurality of AND gates.

* * * * *